United States Patent [19]

Gonnet et al.

[11] Patent Number: 4,687,789
[45] Date of Patent: Aug. 18, 1987

[54] WATER SOLUBLE DISPERSANT FOR WATER-BASED PIGMENT COMPOUNDS COMPRISING A TERPOLYMER OF ACRYLIC ACID METHACRYLIC ACID AND ITACONIC ACID

[75] Inventors: Olivier Gonnet, St Andre-de-Corcy; Jacky Rousset, St Trivier-sur-Moignans, both of France

[73] Assignee: Coatex S.A., Caluire, France

[21] Appl. No.: 837,575

[22] Filed: Mar. 4, 1986

Related U.S. Application Data

[63] Continuation of Ser. No. 739,704, May 31, 1985, abandoned.

[30] Foreign Application Priority Data

Dec. 3, 1984 [FR] France .............................. 84 18579

[51] Int. Cl.$^4$ ...................... C08F 220/06; C08F 6/14; C08K 3/10; C08K 9/02
[52] U.S. Cl. .................................. 523/122; 523/200; 523/333; 524/366; 524/377; 524/386; 524/405; 524/413; 524/425; 524/432; 524/522; 524/560
[58] Field of Search ............... 524/366, 377, 386, 405, 524/413, 432, 425, 522, 560; 523/122, 200, 333

[56] References Cited

FOREIGN PATENT DOCUMENTS 0125519 11/1984 European Pat. Off. .

OTHER PUBLICATIONS

Derwent Abstract 84-289832/47, Soc. Coatex EP-125519.

Primary Examiner—Herbert J. Lilling
Attorney, Agent, or Firm—Oblon, Fisher, Spivak, McClelland & Maier

[57] ABSTRACT

A water soluble ethylenic copolymer-based dispersant for water-based pigment compounds, comprising a liquid phase, a binder which is an emulsion polymer, especially without protective colloids and which contains a considerable density of anionic groups, of pigments wholly or partially reactive with regard to their medium by the creation of bonds between the particles of emulsion polymer and the metallic ion of the partially soluble reactive pigment, characterized by the fact that in order to confer on such water-based pigment compounds definable rheological characteristics, which can be adjusted in advance and remain stable over periods of time, the said water soluble dispersant is an acrylic, methacrylic and itaconic acid copolymer.

20 Claims, No Drawings

WATER SOLUBLE DISPERSANT FOR WATER-BASED PIGMENT COMPOUNDS COMPRISING A TERPOLYMER OF ACRYLIC ACID METHACRYLIC ACID AND ITACONIC ACID

This application is a continuation of application Ser. No. 739,704, filed May 31, 1985, now abandoned.

The subject of this invention is a water soluble dispersant for water-based pigment compounds, formed from acrylic, methacrylic and itaconic acid copolymers.

This invention also concerns water-based pigment compounds prepared with this type of dispersant.

Water-based pigment compounds are known to specialists which consist of a liquid phase, which may be water or an organic solvent which can be mixed with water, or even of a mixture of the two, of a so-called "emulsion polymer" in the liquid phase, also known as the "binder" and of pigments and fillers which may be either totally or partially inert or reactive with their surrounding medium, such as zinc oxide, for example; such compounds may also contain various additives such as biocides, thickeners and anti-foaming agents and so on, and finally a pigment and filler dispersant consisting of a polymer which is water soluble, unlike the "binder" which consists of the emulsion polymer.

It has been known for some while that in practice the simultaneous presence in a water-based pigment compound of certain emulsion polymers together with a reactive pigment such as zinc oxide, lead silico-chromate, zinc chromate, even when the latter accounts for only a very small proportion of the pigments present in the medium, brings about a change in the rheological characteristics of the compound concerned, which manifests itself by an often rapid and always irreversible rise in viscosity, which may even lead to gelification or solidification in extreme cases.

Two types of state-of-the-art emulsion polymer are known, which have been used in the past as pigment binders in water-based pigment compounds.

In the first instance, the emulsion polymer is prepared by the copolymerization of monomers such as vinyl acetate and butyl acrylate, for example, in the presence of a protective colloid such as hydroxyethyl cellulose, for example, which is added to the compound in the course of polymerization. The use of this first type of emulsion polymer as a binder in water-based pigment compounds, while reactive pigments are present, does not generally change the rheological characteristics of these compounds.

In the second instance which is very much more widely used than the first, the emulsion polymer, which contains a considerable density of anionic groups, is produced by copolymerization in the absence of protective colloids, of hydrophobic monomers such as styrene and butyl acrylate, for example, and from an anionic hydrophilic monomer such as acrylic acid, for example. The use of this second type of emulsion polymer as a binder in water-based pigment compounds causes changes in their rheological characteristics. Although the carboxylic groups which are present at the surface of particles of emulsion polymers exert a stabilizing effect, these same carboxylic groups are also capable of reacting with the soluable fraction of the reactive pigment and of thus creating a bond between the particles of the emulsion. In other words, the metallic ion of the partially soluble reactive pigment creates bonds between the particles of the emulsion polymer. As a result, this reaction within the water-based pigment compounds between the partially soluble reactive pigment and the emulsion polymer brings about a rise in the viscosity of the compound concerned, which may even result in its solidification.

Between these two extreme cases of emulsion polymer, there are also instances of emulsion polymers which are hybrids of the two types referred to here.

It can thus be seen that rheological characteristics of water-based pigment compounds of this type can be significantly modified as a result of the simultaneous presence of an emulsion polymer of the second type and of an even only slightly soluble reactive pigment.

Thus, the deleterious effect of this second type of emulsion polymer on reactive pigments as well as the ever more widespread use of emulsion polymers of the second type in water-based pigment compounds for coating purposes in particular, have been the two reasons which have stimulated specialists to add a water soluble dispersant to water-based pigment compounds of this type, especially in cases where one of the pigments present is reactive with its own medium. The presence of a dispersant of this type can be expected to help deflocculation of the elementary particles and to maintain deflocculation at an optimal level since the fineness of the pigment does not merely enhance its covering power but also improves the opacity and appearance of a coating produced in this way. In other words, the presence of a pigment dispersant is desirable in order to combat the natural tendency of pigments to form aggregates in water-based emulsions, which contribute to decreasing covering power and lead to modification of rheological characteristics.

Numerous dispersants have already been put forward to specialists for use in water-based pigment compounds and have been widely described in the technical literature:

The first type of dispersant to be put forward was proposed in Canadian patent No. 655,884 which consisted of a copolymer of methacrylic acid and acrylic and methacrylic esters using an excess persulfate as initiator of polymerization, since the sulfate groups present in the copolymer are reputed to be responsible for the excellent pigment dispersing properties of the copolymer produced in this way.

An other type of water soluble pigment dispersant is described in U.S. Pat. No. 3,840,487. This dispersant is a copolymer of an unsaturated mono-carboxylic acid with 40–95 mole percent, such as acrylic, methacrylic or crotonic acid together with the ester of an unsaturated carboxylic acid with 5–60 mole percent such as methyl, ethyl, propyl or butyl acrylate, methyl methacrylate and ethyl crotonate. This copolymer is employed as a dispersant in emulsion paints containing non-reactive inorganic pigments and a binder, the average molecular weight of such a copolymer being below 75,000.

A further type of water soluble pigment dispersant is claimed in UK Pat. No. 985,276 for the creation of stable, water-based suspensions of pigments or organic or inorganic origin. This dispersant is a copolymer of acrylic acid, methacrylic acid or of one or several mono or polyalcohol esters of aliphatic chains above 12 carbon atoms, of acrylic and/or methacrylic acids.

In addition to the above, an other type of water soluble pigment dispersant is also described in U.S. Pat. No. 3,980,602. This dispersant, which is an acrylic copolymer with an average molecular weight of 500–30,000, consisting of:

(a) 20–80% by weight of a constituent selected from a group comprising styrene, an alkyl methacrylate or a mixture of styrene and alkyl methacrylate, (b) 15–55% by weight of an alkyl acrylate, where the alkyl group contains 2–12 carbon atoms, (c) Finally, 3–25% by weight of acrylic or methacrylic acid.

Then, there is an other type of water soluble pigment dispersant which is described in U.S. Pat. No. 2,930,775 and consists of a copolymer of maleic anhydride and di-isobutylene of a molecular weight between 750–5,000. Water soluble additives of this type are recognized to possess excellent dispersive properties for the preparation of water-based pigment compounds such as water-based emulsion coatings, this is because of their pigment dispersing activity and their ability to stabilize the medium over longer periods during which the pigments employed remain inert with regard to the medium, that is to say whenever such pigments as titanium dioxide or other derivatives of titanium, barium sulfate, calcium carbonate, silica, talc, mica, various clays, iron oxide, carbon black or cadmium sulfide are employed, for example and remain inert with regard to the emulsion polymer (binder).

However, the situation is quite different when water-based pigment compounds contain at least one reactive pigment with a tendency to dissolve under the conditions under which it is processed; typical pigments of this kind include zinc oxide, lead silico-chromate, zinc chromate, barium metaborate or zinc molybdate, all which are commonly employed in the manufacture of corrosion-resistant paints. As has been stated above, all of these reactive pigments display incompatibility with regard to polymer emulsions of the second type (binders). This shows itself by an often frequent and always deleterious and irreversible rise in the viscosity of the water-based pigment compounds which thus become unfit for their intended purpose, some of them even solidifying in the process.

An attempt to eliminate the above disadvantages which result from incompatibility between certain reactive pigments and the emulsion polymers commonly employed in the preparation of water-based pigment compounds, can be found in a proposal contained in the French technical literature (French Pat. No. 2 404 017) to employ a water soluble dispersant comprising an ethylenic copolymer with the following composition:

(a) Over 25% by weight of motives of one or several alpha-, beta monoethylenically unsaturated carboxylic acids as a salt or free acid such as acrylic and methacrylic acids, other alpha-substituted polymerizable acrylic acids or itaconic acid, whereby methacrylic and acrylic acids are preferred.

(b) Motives of at least one other ethylenically unsaturated monomer selected from the group comprising acrylic and methacrylic esters of aliphatic, cycloaliphatic or aromatic $C_1$–$C_{18}$ alcohols, styrene, acrylonitrile or vinyl acetate . . . where the average molecular weight of the copolymer constituting the dispersant lies between 500 and 15,000.

Now, as the applicant has had numerous occasions to observe during the experimental preparation of water-based pigment compounds where at least one of the pigments is reactive, such as zinc oxide, the effectiveness of the copolymer, which it is claimed in the French patent application referred to above, acts as a dispersant, will vary very greatly depending on whether the emulsion copolymer or binder concerned is of the type with or without protective colloids (first or second types, respectively). In cases where the emulsion polymer is accompanied by protective colloids, the above-mentioned water-based compounds, that is to say compounds containing at least one reactive pigment prepared in the presence of one of the dispersants referred to in the above-mentioned French patent, provide results which are perfectly acceptable to the expert and which are entirely comparable to those obtained with water-based pigment compounds using non-reactive pigments. In other words, there is no alteration in the rheological characteristics of pigments of water-based compounds of this type over a period of time.

On the other hand, in cases where the emulsion polymer or binder is not accompanied by protective colloids (second type), water-based compounds containing at least one reactive pigment and prepared in the presence of at least one of the dispersants referred to in the above-mentioned French patent, display considerable anomalies which manifest themselves by a rapid and irreversible deterioration of their rheological characteristics, thus displaying an incompatibility between reactive pigments on the one hand and the emulsion polymer on the other. This incompatibility which is highly unacceptable to the specialist, reveals itself, for example, by a considerable rise in the viscosity over a period of time, since the metallic ion of the partially soluble reactive pigment creates a bond between the particles of the emulsion polymer which, as has been said above, is the cause of the observed rise in the viscosity.

Given the economic and technical requirements for water-based pigment compounds of well defined rheological characteristics and whose performance can be optimized, that is to say, is adjustable at will and remains stable over periods of time, especially when at least one of the pigments present is reactive with its own medium, the applicants in the pursuit of their researches have been able to identify and develop a pigment dispersant which renders reactive pigments such as zinc oxide, for example, particularly compatible with all emulsion polymers.

The water soluble dispersant according to this invention, which is an acrylic copolymer, is typically a copolymer of acrylic, methacrylic and itaconic acids.

Copolymers according to this invention generally contain 2.5–96% by weight but preferably 5–70% by weight of acrylic acid, from 2–85% but preferably 5–70% of methacrylic acid and 2–40% but preferably 5–35% of itaconic acid.

Unlike previous state-of-the-art solutions in which the water soluble pigment dispersant is a copolymer of at least one ethylenic acid and of at least one ethylenic ester, in this invention the water soluble dispersant is a copolymer which entirely consists of three ethylenic acids.

These acrylic copolymers are prepared according to known processes by radical copolymerization of acrylic, methacrylic and itaconic acids in the presence of either a redox polymerization system using typically organic compounds based on hydroxylamine, metabisulfite, peroxides and persalts, for example, such as hydrogen peroxide or persulfate . . . , either in the presence of initiators such as azobisdi-isobutyronitrile, whether in the presence or not of chain transfer agents such as alcohols or mercaptans . . . .

On completion of polymerization, the aqueous polymerisate solution obtained can be used as it is as an acid or can be partially or totally neutralized by at least one suitable neutralizing agent with a mono or polyvalent function.

The total or partial neutralizing agent with a monovalent function is selected from a group consisting of alkaline cations, in particular sodium and potassium, or possibly ammonium or even primary, secondary or teritary aliphatic and/or cyclical amines, such as the ethanol amines (mono, di- or tri-ethanol amine), mono and di-ethylamine, cyclohexylamine, methyl-cyclohexylamine or amino-methylpropanol . . . .

The partial or total neutralizing agent with a polyvalent function is on the other hand selected from a group consisting of divalent alkaline earth cations, in particular magnesium, manganese and calcium or even zinc, and also by trivalent cations, aluminum or even in the case of cations of higher valency such as aliphatic and/or cyclical polyamines such as ethylene diamine, diethylene triamine and phenylene diamine, for example.

The partial or toal neutralization of the acid copolymer sites can be easily obtained by the possible combinations between at least one neutralizing agent with a monovalent function and at least one neutralizing agent with a polyvalent function.

However, the aqueous polymerisate solution can also be processed by all state-of-the-art methods to eliminate its liquid phase and isolate the acrylic copolymers in the form of a fine powder which can be used in this other form as a dispersant.

The water soluble dispersant according to this invention is, as the applicants have been able to establish, a fraction of acrylic, methacrylic and itaconic acid copolymers whose specific viscosity lies in the range of 0.3–1.6, and preferably between 0.4–1.0.

The specific viscosity of copolymers according to this invention, which is indicated by the symbol "$\eta$" is determined in the following way:

A copolymer solution is prepared in the form of a sodium salt by dissolving 50 g of dry copolymer in 1,000 ml of a solution made of distilled water and 60 g of sodium chloride. Then, with a capillary viscosimeter placed in a bath thermostatically controlled at 25° C., one measures the time taken for a given volume of the above solution containing the alkaline acrylic copolymer to run off and also the time taken for the same volume of the aqueous sodium chloride solution without the above copolymers. Specific viscosity "$\eta$" can now be defined according to the following relation:

$$\eta = \frac{\text{(polymer solution run-off time)} - \text{(NaCl solution run-off time)}}{\text{(NaCl solution run-off time)}}$$

The capillary tube is usually selected so that the flow time of the NaCl solution without the copolymer is about 90–100 seconds, thus providing a very highly accurate measurement of specific viscosity.

This invention also concerns water-based pigment compounds comprising a liquid phase, an emulsion polymer of the second type obtained by copolymerization of hydrophobic monomers and of an anionic hydrophilic monomer, of finely powdered pigments, one of which at least is reactive with regard to its own medium, inorganic fillers, various state-of-the-art additives and finally the dispersant which is a water soluble copolymer of the type defined in the framework of this invention.

The pigments used in the preparation of water-based pigment compounds according to this invention are generally polyvalent metal compounds of which typical examples are non-reactive pigments such as titanium dioxide as well as the other pigments derived from titanium, barium sulfate, calcium carbonate, kaolin, talc, mica, silica, clays in general, ferrous oxide, carbon black, cadmium sulfide, chrome oxides but also pigments which are reactive with their medium, such as typically and preferably zinc oxide, zinc molybdate, zinc chromate, lead silico-chromate, barium metaborate, and titanium oxides surface-treated with a coating containing zinc oxide.

Water-based pigment compounds according to this invention, compared with those using prior art dispersants can be handled even when they have a high dry matter content, that is to say a low liquid phase, as well as other lengthy periods at rest, even after several months.

The liquid phase of this type of compound generally consists of water and/or a compound which can be mixed with water such as a mono or polyalcohol, for example a mono and polyglycol, ethers and esters of mono or polyalcohol or of mono or polyglycol, such as for example, ethylene glycol, diethylene glycol or propylene glycol.

The water soluble pigment dispersant is introduced into the water-based pigment compounds in proportions of 0.05–10, and preferably 0.5–5, which proportions are expressed in terms of a percentage by weight compared with the weight of pigments and fillers.

By the same token, water-based pigment compounds according to this invention may also contain, in line with known practice, other components than the pigment, dispersant and the dispersive liquid phase, which components are added to achieve specific effects. Thus, possible additives include biocides, anionic or non-ionic surfactants of the well-known type. But in addition, anti-foaming agents such as alcohols, mineral oils and silane compounds may also be added at the same time to water-based pigment compounds. Finally, thickeners can be used in water-based pigment compounds in order to modify their rheological characteristics with the aim of improving the smoothness of the film on the base, for example or to improve the stability of the pigment suspension. Thickeners of the well-known type which are used traditionally include for example methyl cellulose, hydroxyethyl cellulose, polyacrylic acid, acrylic and methacrylic copolymers as well as thickeners of the water soluble polyurethane-type which confer improved rheological properties on water-based pigment compounds.

Finally coalescing agents can also be added to water-based pigment compounds, which may consist of an organic solvent which may or may not mix with water such as, for example, ether-monobutylic ethylene glycol or even 2.2.4-trimethylpentanediol-1.3 mono-isobutyrate (Texanol manufactured by Eastman Chemical Products). In practice, water-based pigment compounds can be produced in the following known way (or in any known way) which consists of preparing under constant stirring a water-based solution of the dispersant copolymer according to this invention, to which the pigment(s) have been added. The medium which is obtained in this way, to which various additives of the types already referred to can be added (such as surfactants, thickeners, anti-foaming agents, biocides and coalescents) can undergo a grinding process using traditional techniques such as high speed dissolvers or micro-element grinders.

The amount of water soluble pigment dispersant to be employed will be selected within the range defined above. However, as any expert knows, this quantity will depend on the size, shape and type of the particles concerned.

A certain number of dispersants known previously could only be used in minimal quantities for the preparation of water-based pigment compounds, since the use of excessive amounts resulted in unstable dispersion and even in pigment flocculation. In the case of the water soluble dispersant according to this invention, excellent reactive pigment dispersion can be obtained compared with state-of-the-art products; this is all the more true when non-reactive pigments and fillers are concerned. This means also confers on water-based pigment compounds excellent stability over periods of time, which is demonstrated by their sustained rheological characteristics even during prolonged storage.

The familiar method of demonstrating the excellent dispersive characteristics of copolymers according to this invention and especially their ability to be employed in water-based pigment compounds where the pigments are partially or entirely reactive consists of using zinc oxide as the reactive pigment since this substance generally causes real stability problems when it is used in compounds together with an emulsion polymer of the second type as a binder. For example, paint prepared with this reactive pigment dispersed by means of one of the previously known substances, will display poor stability characteristics over periods of time. In point of fact, it is well-known that zinc oxide will partially dissolve and react with the emulsion polymer (binder) and will cause rapid degradation of the rheological characteristics of such a paint, despite the presence of a dispersant.

On the other hand, a paint prepared with the same reactive pigment using a dispersant according to the invention and where an emulsion polymer of the second type is employed, displays excellent stability over periods of time since the effectiveness of this substance can be demonstrated by the fact that the print will maintain its viscosity even after six months' aging at ambient temperature and/or one month at 60° C.

Thus, the instability of a water-based pigment compound or even the ineffectiveness of reactive pigment dispersants, such as zinc oxide, with respect to emulsion polymers of the second type, is frequently demonstrated by a sharp rise of viscosity during storage and even by the gelification or solidification of the compound itself.

It will thus be appreciated that the principal property of the dispersant according to this invention, lies in the fact that when it is employed in water-based pigment compounds, no sharp rise in viscosity is observed, nor does the product solidify during lengthy storage at ambient temperatures or during shorter term exposure to higher temperatures, when a reactive type of pigment is used.

By the same token, with a view to using a pigment paste to color an emulsion paint (which the specialist still refers to as the "tint base") which may wholly or partially contain one and/or the other reactive pigment such as zinc oxide, it is preferable to employ the dispersant according to this invention for the preparation of this pigment paste and/or in the above-mentioned tint base to ensure the stability over a period of time of the water-based pigment compound resulting from the mixing of these two components.

The scope and the interesting features of this invention will be better appreciated with the help of the following examples:

EXAMPLE 1

This example illustrates the use of some typical earlier state-of-the-art water-based pigment compounds, comprising among other constituents zinc oxide as a reactive pigment, an emulsion polymer or binder belonging to both of the categories referred to above and the sodium salt of a homopolymer of methacrylic acid which is a dispersant of a type formerly in common use.

For this purpose, paint was prepared according to the following method: the following constituents, expressed in parts by weight, were added one after another in a suitable two liter container, fitted with a so-called "shear-type turbine" stirring device rotating at about 1,000 rpm (this is a Cowles-type dissolver with which specialists are familiar):

| | |
|---|---|
| (a) water | 160 |
| (b) hydroxyethyl cellulose as a thickener (Natrosol 250 HR marketed by Hercules Inc.) | 2 |
| (c) a dispersant containing 30% of active constituent (the sodium salt of a homopolymer of methacrylic acid according to a Canadian patent 655,884 based on earlier state-of-the-art) | 8 |
| (d) biocide additive (Mergal K6N marketed by Riedel de Haen) | 2 |
| (e) anti-foaming additive (BYK 073 marketed by Byk Chemie) | 1.5 |
| (f) reactive pigment: zinc oxide (Neige A marketed by Vieille Montagne) | 40 |
| (g) non-reactive pigment (RL 68 marketed by Thann et Mulhouse) | 130 |
| (h) fillers: | |
| (h1) calcium carbonate (BLP2 marketed by Omya Inc.) | 220 |
| (h2) talc (20 MO marketed by the Societe des Talcs de Luzenac) | 30 |
| (i) monoethylene glycol | 10 |
| (j) emulsion polymer: binder expressed in parts of dry matter | 162.5 |
| (k) coalescing solvent (Texanol marketed by Eastman Chemical Prdts) | 15 |
| (l) water to make up a total of 993.5 parts by weight | |

Three mixtures were prepared in this way using different emulsion polymers as binders which are submitted to an accelerated aging test in an oven at 60° C. for one month and to a storage test at ambient temperature for six months; at the end of this period viscosity was measured using a Brookfield (RVT)-type viscosimeter at 10 rpm. All the results are summarized in Table I below:

TABLE I

| EMULSION POLYMER (BINDER) | VISCOSITY AFTER 24 H IN CENTIPOISES | VISCOSITY AFTER 1 MONTH AT 60° C. IN CENTIPOISES | VISCOSITY AFTER 6 MONTHS STORAGE AT AMBIENT TEMPERATURE IN CENTIPOISES |
|---|---|---|---|
| Formulation 1 Type 1 copolymer of acrylic or methacrylic esters with protective | 5 800 | 5 500 | 6 000 |

TABLE I-continued

| EMULSION POLYMER (BINDER) | VISCOSITY AFTER 24 H IN CENTI-POISES | VISCOSITY AFTER 1 MONTH AT 60° C. IN CENTI-POISES | VISCOSITY AFTER 6 MONTHS STORAGE AT AMBIENT TEMPERATURE IN CENTI-POISES |
|---|---|---|---|
| colloid. (Primal AC 507 marketed by Rohm & Haas) | | | |
| Formulation 2 Type 1 copolymer of acrylic or methacrylic esters with protective colloid (Primal AC 388 marketed by Rohm & Haas) | 5 200 | 5 500 | 5 400 |
| Formulation 3 Type 2 styrene and acrylic ester copolymer w/o protective colloid | 8 500 | Solidification after 1 week | Solidification after two months |

The above results show that in the case of emulsion polymers (type 1 binders) with a protective colloid, the rheological characteristics of water-based pigment compounds remain stable over periods of time, whereas in the case of emulsion polymers (type 2 binders) without protective colloids, the rheological characteristics of water-based pigment compounds degrade extremely rapidly (solidification).

EXAMPLE 2

This example shows three typical water-based pigment compounds according to earlier state-of-the-art, comprising among their various constituents zinc oxide as a reactive pigment, an emulsion polymer (binder) belonging to the type 2 classification referred to above without protective colloids, and various dispersants used in earlier state-of-the-art techniques.

For this purpose, a semigloss paint was prepared according to the same method as used in Example 1 above, by adding the following components in turn, the quantities being expressed in parts by weight:

| | |
|---|---|
| (a) water | 50 |
| (b) monopropylene glycol | 40 |
| (c) a dispersant expressed in terms of active matter (defined in Table II below) | 4.6 |
| (d) biocide additive (Mergal K6N marketed by Riedel de Haen) | 3 |
| (e) anti-foaming additive (Nopco NDW marketed by Diamond-Shamrock Inc.) | 2 |
| (f) reactive pigment: zinc oxide (Neige A marketed by Vieille Montagne) | 40 |
| (g) non-reactive pigment: titanium dioxide (RHD2 marketed by Tioxide Inc.) | 190 |
| (h) filler: calcium carbonate (Hydrocarb L marketed by Omya Inc.) | 120 |
| (i) coalescing solvent (butyl diglycol) | 20 |
| (j) emulsion polymer (binder) (Acronal 290 D, a type 2 polymer without protective colloids, a styrene and acrylic ester copolymer marketed by BASF) | 440 |
| (k) thickener: water soluble polyurethane (in a 10% by weight solution - BR 100 marketed by Coatex) | 51 |
| (l) water | 40 |

Three mixtures (4, 5, 6) were prepared in this way, each of which contained a specific earlier state-of-the-art dispersant and the mixtures were submitted to the same aging tests as in Example 1 above.

The results of all these tests are shown in Table II below:

TABLE II

| DISPERSANT | VISCOSITY AFTER 24 H. IN CENTI-POISES | VISCOSITY AFTER 1 MONTH AT 60° C. IN CENTI-POISES | VISCOSITY AFTER 6 MONTHS STORAGE AT AMBIENT TEMPERATURE IN CENTI-POISES |
|---|---|---|---|
| FORMULATION 4 Acrylic acid butyl acrylate copolymer according to U.S. Pat. No. 3840487 | 3 000 | Solidification after 1 week | Solidification |
| FORMULATION 5 Tamol SG 1 marketed by Rohm & Haas | 10 000 | Solidification after 1 week | Solidification |
| FORMULATION 6 Acrylic acid (30%) methacrylic acid (30%) itaconic acid (11%) and butyl acrylate copolymer | 2 400 | Solidification after two weeks | Solidification |

These results show that when an emulsion polymer (binder) of the second type without protective colloids, of a type which is being more and more widely used, is associated with a reactive pigment such as zinc oxide together with an earlier type of dispersant, the result will be rapid solidification of the water-based pigment compounds containing these substances.

EXAMPLE 3

This example shows a means of preparing the dispersant according to this invention.

For this purpose, a 1,000 ml vessel was fitted with a mechanical stirrer, a vertical condensor, a means of heating and three dosing pumps.

200 g of deionized water and 0.3 g of copper acetate were placed in the vessel and heated to a reflux temperature before simultaneously adding over a period of two hours the following solutions 1-3 with the dosing pumps:

| Solution 1: | deionized water | 147.0 g |
|---|---|---|
| | methacrylic acid | 99.2 g |
| | acrylic acid | 108.5 g |
| | itaconic acid | 12.1 g |
| Solution 2: | deionized water | 42.5 g |
| | hydrogen peroxide (130 vols) | 30.0 g |
| Solution 3: | deionized water | 60.0 g |
| | sodium metabisulfite | 2.0 g |

Solutions 2 and 3 comprise the redox polymerization system.

After adding the above components, the mixtures were maintained at their reflux temperature for one hour. The resulting polymer was neutralized down to a pH of 8.5 with sodium hydroxide, resulting in a solution containing 35% active matter by weight.

EXAMPLE 4

This example illustrates the preparation, according to the method described in Example 3, of dispersants based either on earlier state-of-the-art or according to this invention, and other incorporation in water-based pigment compounds comprising among their various constituents zinc oxide as a reactive pigment, a type 2 emulsion polymer (or binder) referred to above, that is to say without protective colloids and various dispersants from earlier state-of-the-art practice (formulations 7-10) as well as dispersants according to this invention (formulations 11-16).

For the preparation of dispersants, both of the earlier state-of-the-art type as well as according to this invention, the three water-based solutions referred to in Example 3 were used, the first solution containing monomers and solutions 2 and 3 constituting the redox polymerization system.

On completion of polymerization and neutralization with sodium hydroxide down to a pH of 8.5, a copolymer solution was obtained whose specific viscosity was measured.

Four polymers were also prepared based on earlier state-of-the-art (refs. A, B, C, and D) as well as six copolymers according to this invention (refs. E, F, G, H, I and J) for which the composition of the monomer and/or redox polymerization system was varied.

A paint was then prepared (a water-based pigment compound) according to the same method as Example 1, by adding in turn the following constituents expressed in parts by weight:

| | |
|---|---|
| (a) water | 160 |
| (b) thickener: hydroxyethyl cellulose | 2 |
| (Natrosol 250 HR marketed by Hercules Inc.) | |
| (c) a dispersant expressed as dry matter | 3 |
| (d) biocide additive | 1 |
| (Mergal K6N marketed by Riedel de Haen) | |
| (e) anti-foaming additive | 1.5 |
| (BYK 073 marketed by Byk Chemie) | |
| (f) reactive pigment: zinc oxide | 40 |
| (Neige A marketed by Vieille Montagne) | |
| (g) non-reactive pigment: titanium oxide | 130 |
| (RL 68 marketed by Thann et Mulhouse) | |
| (h) fillers: | |
| (h1) calcium carbonate | 140 |
| (Durcal 5 marketed by Omya Inc., mean diameter 5 microns) | |
| (h2) calcium carbonate | 80 |
| (Hydrocarb marketed by Omya Inc., mean diameter 1 micron) | |
| (i) monoethylene glycol | 10 |
| (j) type 2 emulsion polymer without protective colloid containing 50% of dry matter (binder) | 325 |
| (Rhodopas DS 910 marketed by Rhone-Poulenc) | |
| (k) coalescent solvent | 0.5 |
| (Texanol marketed by Eastman Chemical Products) | |
| (l) water to make a total of 993 parts by weight | |

Four formulations were prepared in this way (7-11) using various dispersants (A, B, C, D and E) based on previous state-of-the-art and six formulations (12-17) were prepared using various dispersants (F, G, H, I, J and K) according to this invention (all the formulations were submitted to accelerated aging tests at 60° C. in an autoclave for a period of one month and to a storage test at ambient temperature lasting six months, at the end of which periods Brookfield viscosity was measured as in Example 1.

All the results concerning the preparation of earlier state-of-the-art dispersants A-D as well as the results concerning water-based pigment compounds in which these dispersants were used (formulations 7-10) are summarized in Table III below:

TABLE III

| PERCENTAGE BY WEIGHT | EARLIER STATE OF THE ART DISPERSANT | | | | |
|---|---|---|---|---|---|
| | A | B | C | D | E |
| Acrylic acid | 0 | 100 | 0 | 0 | 55 |
| Methacrylic acid | 100 | 0 | 70 | 55 | 0 |
| Itaconic acid | 0 | 0 | 0 | 15 | 15 |
| Butyl methacrylate | 0 | 0 | 30 | 30 | 30 |
| Specific visc. | 0.90 | 0.75 | 0.71 | 0.79 | 0.84 |
| Formulations (Water-based pigment compounds) | 7 | 8 | 9 | 10 | 11 |
| Viscosity in centipoises after 24 hrs. | 15000 | 16000 | 12000 | 13000 | 15000 |
| Viscosity in centipoises after 1 month at 60° C. | Solidification | Solidification | Solidification | Solidification | Solidification |
| Viscosity in centipoises after 6 months storage at ambient temp. | | Solidification | Solidification | Solidification | Solidification |

All the results concerning the preparation of dispersants according to the invention (F, G, H, I, J and K) as well the results concerning water-based pigment compounds incorporating these dispersants (formulations 12-17) are summarized in Table IV below:

TABLE IV

| PERCENTAGE BY WEIGHT | DISPERSANTS ACCORDING TO THE INVENTION | | | | | |
|---|---|---|---|---|---|---|
| | F | G | H | I | J | K |
| Acrylic acid | 49.4 | 44.5 | 41.8 | 64.6 | 44.5 | 44.5 |
| Methacrylic acid | 45.1 | 40.50 | 38.3 | 5.2 | 40.5 | 40.5 |
| Itaconic acid | 5.5 | 15.00 | 19.9 | 30.2 | 15.0 | 15.0 |
| Specific visc. | 0.54 | 0.65 | 0.60 | 0.50 | 0.90 | 0.42 |
| Formulations (Water-based pigment compounds) | 12 | 13 | 14 | 15 | 16 | 17 |
| Viscosity in centipoises after 24 hrs. | 6200 | 7000 | 8200 | 6000 | 7400 | 6800 |
| Viscosity in centipoises after 1 month at 60° C. | 6600 | 8000 | 10800 | 10800 | 13400 | 10400 |
| Viscosity in centipoises after 6 months storage at ambient temp. | 12400 | 10000 | 13000 | 17200 | 16000 | 23000 |

A comparison of Tables III and IV shows the effectiveness of dispersants according to this invention, since the rheological characteristics of water-based pigment compounds containing these dispersants do not alter or alter only very slightly over periods of time, whereas the rheological characteristics of water-based pigment compounds containing earlier state-of-the-art dispersants are subject to violent changes, going as far as solidification.

EXAMPLE 5

The purpose of this example is to show that the water soluble dispersant according to this invention is a fraction of acrylic, methacrylic and itaconic acid copolymers whose specific viscosity is selected between 0.3–1.6 and preferably between 0.4–1.0.

For this purpose, dispersants according to this invention were prepared using the method described in Example 3, varying the quantity of the redox system employed.

Then, these dispersants were incorporated in water-based pigment compounds identical to the compound in Example 4, that is to say containing zinc oxide as a reactive pigment and an emulsion polymer without a protective colloid (type 2).

Five polymers (refs. J, K, L, M and N) were prepared in this way and were incorporated in five water-based pigment compounds (formulations 16, 17, 18, 19 and 20).

All these formulations were submitted to the same aging tests as in Example 4.

The results concerning the preparation of all dispersants according to this invention as well as those concerning water-based pigment compounds in which these dispersants were incorporated, are summarized in Table V below:

TABLE V

| PERCENTAGE BY WEIGHT | DISPERSANTS ACCORDING TO THE INVENTION | | | | |
|---|---|---|---|---|---|
| | J | K | L | M | N |
| Acrylic acid | 44.5 | 44.5 | 44.4 | 44.5 | 44.5 |
| Methacrylic acid | 40.5 | 40.5 | 40.5 | 40.5 | 40.5 |
| Itaconic acid | 15.0 | 15.0 | 15.0 | 15.0 | 15.0 |
| Specific visc. | 0.90 | 0.42 | 0.31 | 1.53 | 1.70 |
| Formulations (Water-based pigment compounds) | 16 | 17 | 18 | 19 | 20 |
| Viscosity in centipoises after 24 hrs. | 7400 | 6800 | 8200 | 9600 | 12500 |
| Viscosity in centipoises after 1 month at 60° C. | 13400 | 10400 | 18500 | 22000 | 36200 |
| Viscosity in centipoises after 6 months storage at ambient temp. | 16000 | 23000 | 55000 | 48000 | Solidification |

It can thus be seen that outside the limits of specific viscosity established by the applicants, the dispersant according to the invention very rapidly loses its effectiveness, as shown by the viscosity changes affecting water-based pigment compounds containing these dispersants.

EXAMPLE 6

The purpose of this example is to verify that the dispersant according to this invention must be a copolymer formed from three acrylic, methacrylic and itaconic acid monomers and that copolymerization of these monomers pair by pair results in dispersants whose effectiveness is reduced when they are incorporated in water-based pigment compounds containing a reactive pigment such as zinc oxide and an emulsion polymer (type 2) without a protective colloid.

For this purpose, dispersants obtained by copolymerization of two monomers selected among the three referred to above, were prepared according to the method used in Example 3 (refs. O, P and Q).

These dispersants were then incorporated in water-based pigment compounds identical to those in Example 4, that is to say containing a reactive pigment (zinc oxide) and an emulsion polymer without a protective colloid (type 2).

The effectiveness of these three dispersants was compared with that of the dispersant (G) according to the invention (Table IV) incorporated in the same water-based pigment compound as that described in Example 4.

All the results concerning the preparation of these dispersants (refs. O, P and Q) as well as the preparation of the dispersant according to the invention (ref. G) together with the results concerning water-based pigment compounds (formulations 18-23) incorporating these dispersants, have been summarized in Table VI below:

TABLE VI

| PERCENTAGE BY WEIGHT | DISPERSANTS | | | |
|---|---|---|---|---|
| | O | P | Q | G (Invention) |
| Acrylic acid | 0. | 85.0 | 50.0 | 44.5 |
| Methacrylic acid | 85.0 | 0. | 50.0 | 40.5 |
| Itaconic acid | 15.0 | 15.0 | 0 | 15.0 |
| Specific visc. | 0.54 | 0.67 | 0.70 | 0.65 |
| Formulations (Water-based pigment compounds) | 18 | 19 | 20 | 13 |
| Viscosity in centipoises after 24 hrs. | 8200 | 11000 | 10500 | 7000 |
| Viscosity in centipoises after 1 month at 60° C. | 10200 | 28000 | 25000 | 8000 |
| Viscosity in centipoises after 6 months storage at ambient temp. | 53000 | Solidification | 48000 | 10000 |

The results obtained confirm that it is absolutely essential that the dispersant according to this invention, be an acrylic, methacrylic and itaconic acid copolymer.

We claim:

1. A process for the preparation of an aqueous pigment composition comprising:
   forming an aqueous dispersion containing a liquid emulsion of a polymer free of protective colloids and having a high density of anionic groups, of pigments containing metal ions, with a water-soluble dispersant which is a copolymer of acrylic acid, methacrylic acid and itaconic acid, the said dispersant having reactive carboxylate groups which can bond with the metal ions of said pigment while inhibiting their reaction with the emulsion polymer and said dispersant conferring on said aqueous pigment composition definable rheological characteristics which can be established beforehand and which remain stable over a period of time.

2. The process of claim 1, wherein said copolymer comprises from 2.5–96% by weight of acrylic acid, 2–95% by weight of methacrylic acid and 2–40% by weight of itaconic acid.

3. The process of claim 2, wherein said copolymer comprises from 5–70% by weight of acrylic acid, 5–70% by weight of methacrylic acid and 5–35% by weight of itaconic acid.

4. The process of claim 1, wherein the copolymers which constitute the said dispersant are partially neutralized.

5. The process of claim 1, wherein the copolymers which constitute the said dispersant are wholly neutralized.

6. The process of claim 1, wherein said copolymer is neutralized by at least one neutralizing agent which is a monovalent compound or a polyvalent compound.

7. The process of claim 6, wherein said copolymer is neutralized by at least one monovalent compound and at least one polyvalent compound.

8. The process of claim 6, wherein said monovalent neutralizing compound is an alkali compound.

9. The process of claim 8, wherein the alkali component of the neutralizing compound is selected from the group consisting of sodium, potassium, ammonium and an ion of a primary, secondary or tertiary aliphatic and/or cyclic amine.

10. The process of claim 9, wherein said amine ion is an ion of ethanolamine, monoethylamine, diethylamine, cyclohexylamine, methyl-cyclohexylamine or aminomethylpropanol.

11. The process of claim 6, wherein said polyvalent neutralizing compound is an alkaline earth metal compound, a trivalent metal compound or a polyvalent ion of an aliphatic and/or cyclic polyamine.

12. The process of claim 11, wherein said alkaline earth metal is calcium, magnesium, manganese or zinc, said trivalent metal is aluminum, and said polyamine is ethylenediamine, diethylene triamine or phenylene diamine.

13. The process of claim 1, wherein said copolymer of said dispersant has a specific viscosity of 0.3–1.6.

14. The process of claim 13, wherein said specific viscosity ranges from 0.4–1.0.

15. An aqueous pigment composition comprising:
an aqueous dispersion containing a liquid emulsion of a polymer free of protective colloids and having a high density of anionic groups, of pigments containing metal ions, with a water-soluble dispersant which is a copolymer of acrylic acid, methacrylic acid and itaconic acid, the said dispersant having reactive carboxylate groups which can bond with the metal ions of said pigment while inhibiting their reaction with the emulsion polymer and said dispersant conferring on said aqueous pigment composition definable rheological characteristics which can be established beforehand and which remain stable over a period of time.

16. The composition of claim 15, wherein the copolymer dispersant is present in an amount ranging from 0.05–10% by weight based on the amount of filler and pigment in the composition.

17. The composition of claim 16, wherein the amount of said copolymer dispersant ranges from 0.5–5% by weight.

18. The composition of claim 15, wherein the aqueous phase of said dispersion further comprises an organic solvent which can be mixed with water and which is a compound selected from the group consisting of a mono- or polyalcohol, a mono- or polyglycol, an ether or ester of said mono- or polyalcohol and an ether or ester of said mono- or polyglycol.

19. The composition of claim 15, wherein said pigment is a reactive pigment selected from the group consisting of zinc oxide, zinc molybdate, zinc chromate, lead silico-chromate, barium metaborate and titanium oxides surface treated with zinc oxide.

20. The composition of claim 15, which further comprises at least one constituent selected from the group consisting of biocides, anionic or non-ionic surfactants, anti-foaming agents, thickeners and coalescing agents.

* * * * *